(12) United States Patent
Mitchell

(10) Patent No.: US 8,352,130 B2
(45) Date of Patent: Jan. 8, 2013

(54) SYSTEM AND METHOD FOR CONTROLLING A MATERIAL APPLICATION SYSTEM

(75) Inventor: Wade Steven Mitchell, Buckingham, IA (US)

(73) Assignee: Deere & Company, Moline, IL (US)

( * ) Notice: Subject to any disclaimer, the term of this patent is extended or adjusted under 35 U.S.C. 154(b) by 511 days.

(21) Appl. No.: 12/581,505

(22) Filed: Oct. 19, 2009

(65) Prior Publication Data

US 2010/0299030 A1    Nov. 25, 2010

Related U.S. Application Data

(60) Provisional application No. 61/179,853, filed on May 20, 2009.

(51) Int. Cl.
*G06F 7/70* (2006.01)
(52) U.S. Cl. .............. 701/50; 700/283; 180/175
(58) Field of Classification Search .............. 701/50; 700/283, 284; 180/175, 176, 177
See application file for complete search history.

(56) References Cited

U.S. PATENT DOCUMENTS

| | | | |
|---|---|---|---|
| 4,052,003 A | 10/1977 | Steffen | |
| 4,817,870 A * | 4/1989 | Dalton | 239/157 |
| 5,172,861 A | 12/1992 | Lenhardt | |
| 5,278,423 A | 1/1994 | Wangler et al. | |
| 5,417,193 A * | 5/1995 | Fillman et al. | 123/352 |
| 5,539,669 A | 7/1996 | Goeckner et al. | |
| 5,549,089 A * | 8/1996 | Snell et al. | 123/352 |
| 5,755,382 A | 5/1998 | Skotinkov | |
| 5,884,205 A | 3/1999 | Elmore et al. | |
| 5,950,921 A | 9/1999 | Cain et al. | |
| 5,971,294 A | 10/1999 | Thompson et al. | |
| 5,991,687 A | 11/1999 | Hale et al. | |
| 6,126,088 A | 10/2000 | Wilger et al. | |
| 6,529,615 B2 | 3/2003 | Hendrickson et al. | |
| 6,575,874 B2 * | 6/2003 | Ono et al. | 477/120 |
| 6,615,963 B2 * | 9/2003 | Ono et al. | 192/3.63 |
| 6,694,260 B1 | 2/2004 | Rekow | |
| 7,142,966 B2 * | 11/2006 | Saller et al. | 701/50 |
| 7,896,258 B2 * | 3/2011 | Hoisington et al. | 239/155 |
| 2002/0033289 A1 * | 3/2002 | Ono et al. | 180/171 |
| 2002/0033298 A1 * | 3/2002 | Ono et al. | 180/373 |
| 2002/0035008 A1 * | 3/2002 | Ono et al. | 477/37 |
| 2003/0159633 A1 | 8/2003 | Upadhyaya et al. | |
| 2003/0168272 A1 * | 9/2003 | Ono et al. | 180/170 |
| 2004/0034450 A1 * | 2/2004 | Seal et al. | 700/283 |
| 2004/0148057 A1 | 7/2004 | Breed et al. | |
| 2005/0038568 A1 * | 2/2005 | Hood et al. | 700/283 |
| 2005/0149235 A1 * | 7/2005 | Seal et al. | 700/283 |
| 2008/0051255 A1 | 2/2008 | Ringer | |
| 2008/0269988 A1 | 10/2008 | Feller et al. | |
| 2009/0007485 A1 * | 1/2009 | Holland | 47/58.1 R |
| 2009/0224084 A1 * | 9/2009 | Hoisington et al. | 239/754 |

FOREIGN PATENT DOCUMENTS

DE    299089119    8/1998

(Continued)

*Primary Examiner* — Helal A Algahaim

(57) ABSTRACT

An engine speed sensor determines engine speed data of an internal combustion engine for moving a material distribution vehicle. A ground speed sensor measures a ground speed of the material distribution vehicle. A data processor for controlling a dispensation system to distribute an agricultural input or material at a rate based on the measured ground speed and the engine speed data (e.g., sensed engine speed or change in engine speed) to anticipate a change in the ground speed of the material dispensation vehicle such that a lag in the rate of agricultural input delivered is reduced.

20 Claims, 4 Drawing Sheets

| | FOREIGN PATENT DOCUMENTS | | WO | 93/04434 | 3/1993 |
|---|---|---|---|---|---|
| EP | 0726024 | 6/1998 | | | |
| EP | 0864369 | 9/1998 | * cited by examiner | | |

SYSTEM AND METHOD FOR CONTROLLING A MATERIAL APPLICATION SYSTEM

This document (and the accompanying drawings) claims the benefit of the filing date of provisional patent application No. 61/179,853, filed May 20, 2009, under 35 U.S.C. §119(e) or as otherwise provided under applicable law.

FIELD OF THE INVENTION

This invention relates to a system and method for controlling a material application system.

BACKGROUND OF THE INVENTION

A material application system or sprayer may be used to apply, distribute, dispense or spray agricultural inputs on a field at controlled rate. Agricultural inputs may comprise fertilizer, insecticides, herbicides, fungicides, and other chemicals, compounds, or mixtures. Agricultural inputs may be used to treat seeds, roots, plants or the soil, for example. Although the controlled rate of dispensing may compensate for an observed velocity of the material application system that is moved by a vehicle, there is often a lag associated with the observed velocity and actual dispensation onto the field. Thus, there is need to reduce or minimize the effects of such lag, which may result in less accurate dispensing of agricultural inputs than otherwise desired.

SUMMARY OF THE INVENTION

In accordance with one embodiment, an engine speed sensor determines engine speed data for an internal combustion engine for moving a material distribution vehicle. A ground speed sensor measures a ground speed of the material distribution vehicle. A data processor for controlling a dispensation system to distribute an agricultural input or material at a rate based on the measured ground speed and the engine speed data (e.g., sensed engine speed or change in engine speed) to anticipate a change in the ground speed of the material distribution vehicle such that a lag (that otherwise would occur) in the rate of agricultural input delivered is reduced.

DESCRIPTION OF THE PREFERRED EMBODIMENT

Figure 1:
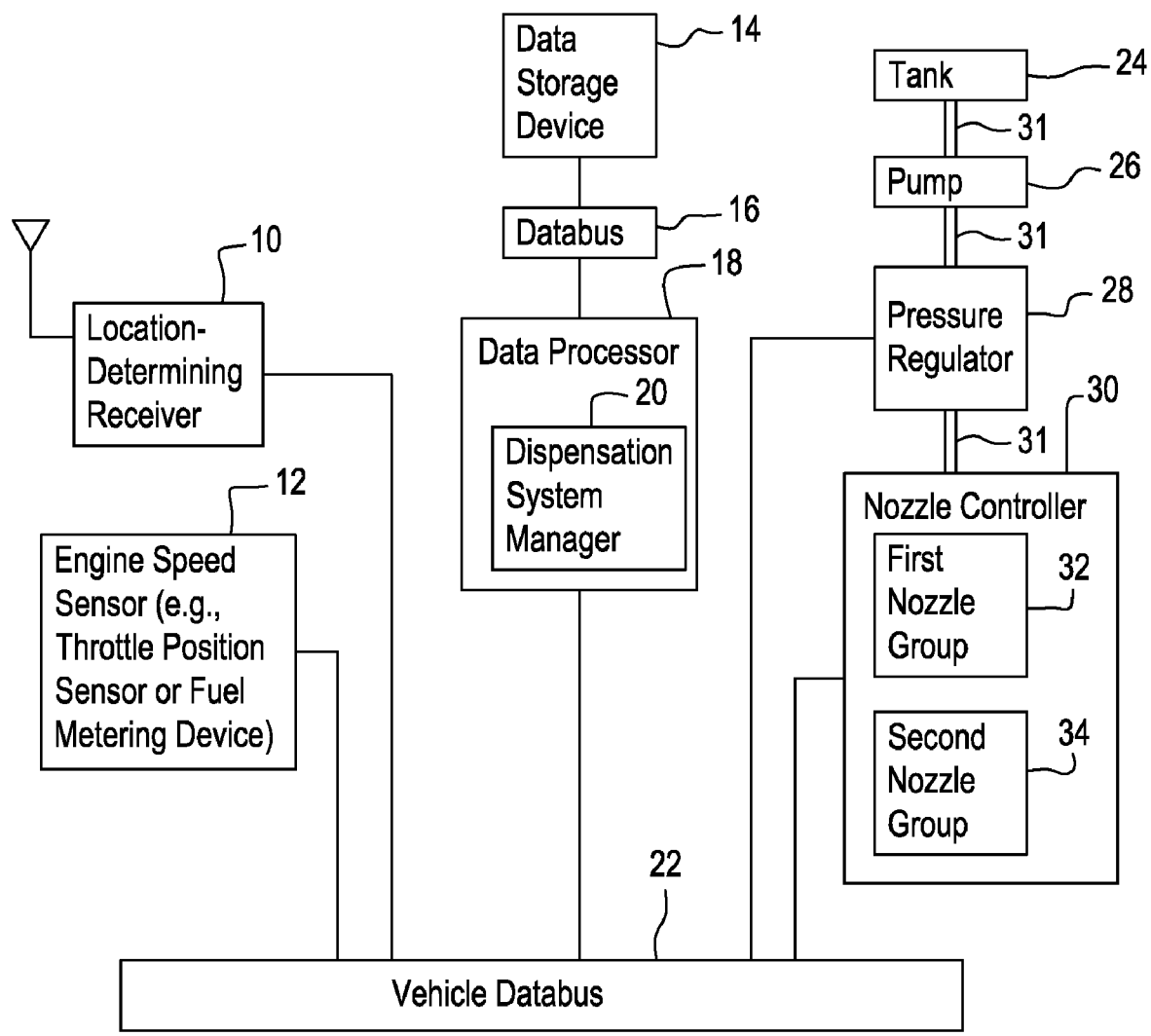
FIG. 1 is a block diagram of one embodiment of a system for controlling a material application system.

In accordance with the embodiment of FIG. 1, a material application system 11 (e.g., sprayer) is adapted for the metered or controlled dispensation of an agricultural input onto a field, the soil or the plants in the field. An agricultural input may comprise fertilizer, insecticides, herbicides, fungicides, and other chemicals, compounds, or mixtures. The agricultural input may be in the form of a liquid, a concentrate, a spray, pellets, powder, or granular form, for instance.

In FIG. 1, a material application system 11 comprises an engine speed sensor 12, a location-determining receiver 10, a data processor 18, a pressure regulator 28, and a nozzle controller 30 coupled to a vehicle data bus 22. The data processor 18 communicates with one or more of the following components via the vehicle data bus 22: the engine speed sensor 12, the location-determining receiver 10, a data processor 18, a pressure regulator 28, and a nozzle controller 30. The data processor 18 communicates with a data storage device 14 via a secondary data bus 16.

The pressure regulator 28 is interposed in or connected to one or more dispensation lines 31 (e.g., tubes, pipe or conduit) between the pump 26 and the first nozzle group 32. Similarly, the pressure regulator 28 is interposed or connected to one or more lines 31 between the pump 26 and the second nozzle group 34. The pump 26 may be disposed in the tank 24 or may be connected to the tank 24 via a line 31 (e.g., a tube, pipe or conduit). The material application system may be propelled by, carried by or mounted on a material distribution vehicle or material dispensation vehicle (e.g., sprayer vehicle).

In one embodiment, the location-determining receiver 10 comprises a global positioning system (GPS) receiver. The location-determining receiver 10 provides one or more of the following: location data or position data (e.g., geographic coordinates) for the vehicle and a velocity or ground speed of the vehicle. In one example, the location-determining receiver 10 may be associated with a secondary receiver that receives a differential correction signal to augment or improve the accuracy of an estimated position or location of a material dispensation vehicle.

In an alternate embodiment, the location-determining receiver 10 may comprise a location-determining receiver that receives signals from one or more reference transmitters at known locations to estimate a position of the location-determining receiver 10; hence, the material dispensation vehicle. In another alternate embodiment, the location-determining receiver 10 may be replaced with an odometer or another dead-reckoning system to estimate a location or position of the vehicle with respect to a reference point (e.g., reference geographic coordinates).

The engine speed sensor 12 comprises a tachometer, a throttle position sensor, a fuel metering device or another device for measuring, directly or indirectly, a rotational velocity of an engine shaft (e.g., a crankshaft) of an internal combustion engine that propels or moves the system 11 or related engine speed data. Engine speed data means engine speed, adjusted engine speed, or a change in engine speed or a change in adjusted engine speed. In a first example, the engine speed sensor 12 comprises a throttle position sensor, where the throttle position sensor refers to a device for sensing a throttle position or throttle opening (e.g., of a throttle body or air flow metering device) or change in the throttle position or throttle opening to determine the throttle opening is opened to increase the flow of air or a fuel air mixture delivered to an intake of the internal combustion engine. The throttle position or change in throttle position may be expressed as (or highly correlated to) an engine speed or change in engine speed, respectively. In a second example, the engine speed sensor 12 comprises an electronic sensor or fuel injection system controller for sensing of a fuel injection rate into the internal combustion engine. In a third example, the engine speed sensor 12 comprises a magnetic field sensor that is stationary and that senses the magnetic field associated with a magnet mounted on a rotatable shaft (e.g., crankshaft) of the internal combustion engine of the vehicle to count the number of rotations or revolutions of the shaft per unit time. The magnetic field sensor may be associated with a clock for tracking time and a counter circuit for tracking the number of revolutions or rotations of the shaft, for example.

The data processor 18 may comprise a microprocessor, a microcontroller, an application specific programming device, a programmable logic array, or another device for processing data. In one embodiment, the data processor 18 further comprises a dispensation system manager 20 (e.g., spray system manager). The dispensation system manager 20 may determine the rate of application of the agricultural input to a corresponding location or position of the field.

The data processor 18 or dispensation system manager 20 may receive estimated location data or position data of the dispensation vehicle or dispensation system along with one or more of the following input data: (a) engine speed data (e.g., throttle position data) from the engine speed controller, (b) gear selection data (e.g., gear ratio data) from a transmission controller or transaxle controller coupled to the vehicle data bus 22, (c) adjusted engine speed data comprising the engine speed data (from the engine speed controller) adjusted for the gear selection data (from a transmission controller or transaxle controller, (d) prescription data for application of the agricultural input based on location of the vehicle or dispensation system, (e) target application data (for the agricultural input) rate versus position or location data of the vehicle from the data storage device 14, ground speed of the vehicle from the location-determining receiver 10 ground speed sensor, and (f) dispensation time lag of an agricultural input versus engine speed data and ground speed data. The data processor 18 or dispensation system manager 20 may use the foregoing input data to generator a suitable control signal or control data for at least one of the pressure regulator 28 and the nozzle controller 30 to control the dispensation, release or distribution of the material or the agricultural input. For example, if the throttle position is opened or increased, the data processor 18 or the dispensation system manager 20 may instantaneously increase the rate of application of the agricultural input (e.g., by sending a signal to the nozzle controller 30) in proportion to the increase in the throttle opening.

The data storage device 14 is capable of storing and facilitating retrieval of stored data. For example, the data storage device 14 may store one or more of the following data: (a) target application rate (of the agricultural input) versus position or location data from the data storage device 14 and (b) dispensation time lag of an agricultural input versus engine speed data and ground speed data.

The tank 24 is capable of holding and storing the agricultural input. The agricultural input in the tank 24 may be applied, distributed, dispensed, or depleted during the operation of the material application system 11. The lines 31 that interconnect the pressure regulator 28 with the first nozzle group 32 and the second nozzle group 34 may comprise conduit, pipes, or tubes. If the agricultural input is in the form of liquid a concentrate or a spray, the lines 31 may carry the agricultural input in liquid form.

However, in an alternate embodiment if the agricultural input is in the form a pellets, powder or granular form, the lines 31 may carry the agricultural input pneumatically or separate pneumatic and material-conveying lines (e.g. gravity fed lines from an elevated tank (e.g., 24)) may be routed to the first nozzle group 32 and the second nozzle group 34.

The pump 26 comprises one or more of the following devices: a pump, a liquid pump, an air pump, a vacuum pump, or a pneumatic pump. The pressure regulator 28 may comprise any device for regulating the flow or pressure of an agricultural input, or an aqueous or oil-based mixture containing the agricultural input. In one example, the pressure regulator 28 comprises a liquid pressure regulator, whereas in another example the pressure regulator 28 comprises a pneumatic pressure regulator.

The pressure regulator 28 may detect and maintain a certain pressure level or pressure level range in dispensation lines 31. For example, the pressure regulator 28 may detect and maintain a certain pressure level range between the pump 26 and the first nozzle group 32 and the second nozzle group 34.

The nozzle controller 30 may switch on or off the first nozzle group 32, the second nozzle group 34, or control the opening size or level of each nozzle in the first nozzle group 32 and the second nozzle group 34, for instance. The first nozzle group 32 and the second nozzle group 34 may each comprise one or more nozzles that are controlled by corresponding solenoids, or other electromechanically operated valves or openings. The nozzle controller 30 may send a control signal, logic signal or control data to the solenoids or electromechanically operated valves or openings of the nozzles (32, 34).

Figure 2:
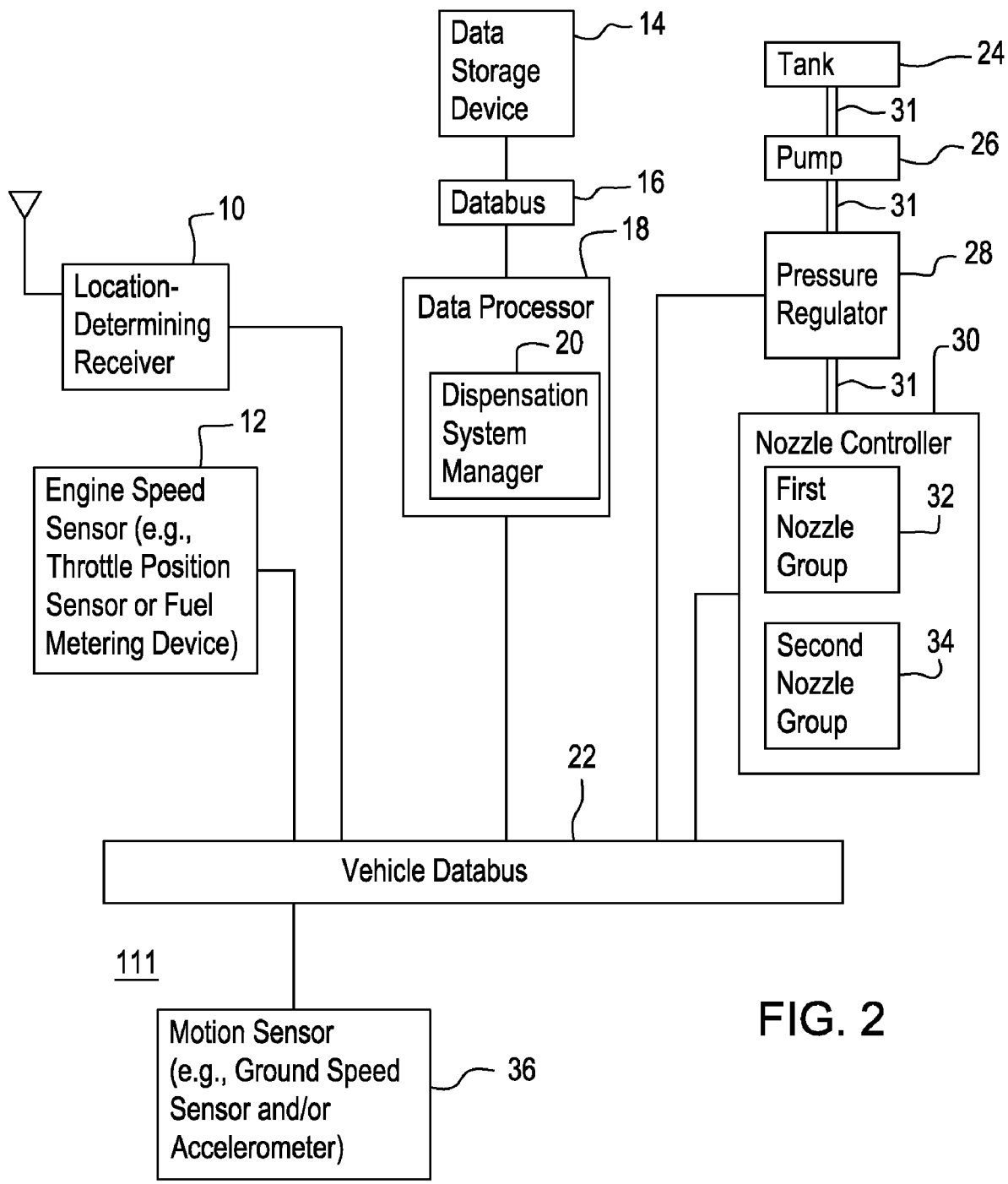
FIG. 2 is a block diagram of another embodiment of a system for controlling a material application system.

The system 111 of FIG. 2 is similar to the system 11 of FIG. 1 except the system 111 of FIG. 2 further comprises a motion sensor 36. The motion sensor 36 is coupled to the vehicle data bus 22. In one embodiment, the motion sensor 36 may comprise a ground speed sensor that estimates a ground speed or velocity of the vehicle. In another embodiment, the motion sensor 36 comprises an accelerometer or other device for determining the acceleration of the vehicle. For example, the motion sensor 36 may comprise the combination of an accelerometer coupled to an integrator such that the output of the accelerometer is vehicular acceleration data and the output of the integrator is vehicle velocity data, where both acceleration data and vehicle velocity (or ground speed data) is made available to the data processor 18 or the dispensation system manager 20.

The nozzle controller 30 may send a control signal, logic signal or control data to the solenoids or electromechanically operated valves or openings of the nozzles (32, 34). For example, if the vehicle is turning or following a curved path (e.g., detectable via a motion sensor 36), the nozzle controller 30 may send a first signal to an outer nozzle (e.g., 32 or 34), and a second signal to an inner nozzle, where the first signal sends more agricultural input to the outer nozzle than the second signal sends to the inner nozzle, where the outer nozzle refers to a nozzle (of the first nozzle group 32 or second nozzle group 34) closest to an outer radius of the turn or curved path of the vehicle, and where the inner nozzle refers to a nozzle (of the first nozzle group 32 or second nozzle group 34) closest to an inner radius of the turn or curved path of the vehicle. Further, the nozzle controller 30 may adjust the respective distribution rates of agricultural input from the first nozzle group 32 and the second nozzle group 34 to compensate for turning or curved paths of the vehicle such that the amount of material distributed over the plants or ground is generally uniform regardless of whether the plant or ground falls in the inside or outside of a turning radius of the vehicle.

Figure 3:
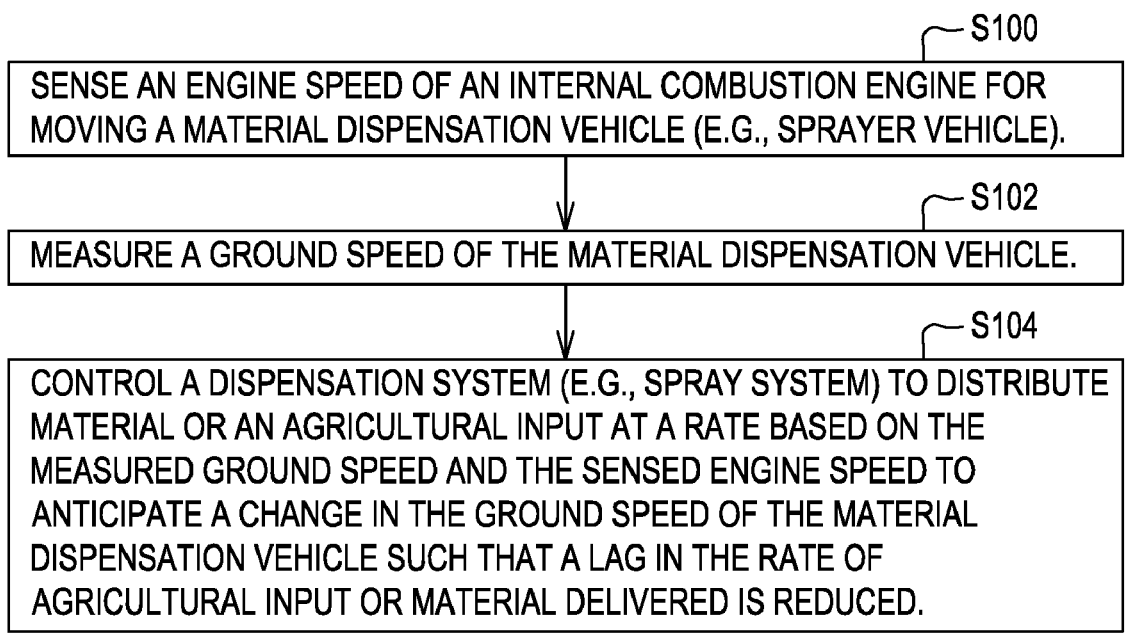
FIG. 3 is a flow chart of one example of a method for controlling a material application system.

FIG. 3 is a flow chart of method for managing or controlling a material application system that is propelled by, mounted on, or carried by a material dispensation vehicle. The method in FIG. 3 starts in step S100.

In step S100, an engine speed sensor 12 senses or detects engine speed data (e.g., engine speed or change in engine speed) of an internal combustion engine for moving a material dispensation vehicle (e.g., sprayer vehicle). The engine speed may be associated with the rotational speed of a crankshaft of an internal combustion engine, for example. Step S100 may be carried out in accordance with various procedures that may be applied alternately or cumulatively. Under a first procedure for carrying out step S100, the engine speed sensor 12, as a throttle position sensor, senses a throttle position or throttle opening (e.g., of a throttle body or air flow metering device) or change in the throttle position or throttle opening to derive an engine speed proportional to the throttle position or throttle opening. Here, the engine speed sensor 12 determines whether or not the throttle opening is opened to increase the flow of air or a fuel air mixture delivered to an intake of the internal combustion engine. The throttle position or change in throttle position may be expressed as (or highly correlated to) an engine speed or change in engine speed, respectively.

Under a second procedure, the engine speed sensor 12, as an electronic sensor or fuel injection system controller, senses a fuel injection rate into the internal combustion engine, where the fuel injection rate may be expressed as an engine speed or a change in engine speed. Under a third procedure, the engine speed sensor 12 as a magnetic field sensor senses the magnetic field associated with a magnet mounted on a rotatable shaft (e.g., crankshaft) of the internal combustion engine of the vehicle to count the number of rotations or revolutions of the shaft per unit time. Under a fourth procedure for carrying out step S100, the engine speed may comprise an adjusted engine speed adjusted by gear selection data (e.g., gear ratio) from a transmission controller or transmission axle controller coupled to the vehicle data bus 22.

In step S102, a ground speed sensor or a motion sensor 36 determines a ground speed (or velocity) of the material dispensation vehicle (e.g., sprayer vehicle).

In step S104, a data processor 18 or dispensation system manager 20 controls a dispensation system to distribute material or an agricultural input at a rate based on the measured ground speed and engine speed data (e.g., the sensed engine speed or adjusted engine speed) to anticipate a change in the ground speed (or velocity) of the material dispensation vehicle such that a lag in the distribution rate (or application rate) of agricultural input or material is reduced. Step S104 may be carried out in accordance with various techniques that may be applied alternately or cumulatively. Under a first technique, step S104 is carried out by retrieving the following data from the data storage device 14: dispensation time lag of an agricultural input versus engine speed data (e.g., change in engine speed) and ground speed data. The dispensation time lag may be compensated for by the data processor 18 or the dispensation system manager 20 advancing or adjusting the dispensing of material by the dispensation time lag. The dispensation time lag may depend upon settings of the material application system 11 (e.g., sprayer system) including one or more of the following factors or a time duration allowance associated with each factor: (a) viscosity or specific gravity of the agricultural input to be distributed via the material application system 11, (b) pressure level or pressure range of the pressure regulator 28, (c) nozzle opening size or nozzle type of the nozzle groups (32,34), (d) length of lines 31 from the pump 26 to the first nozzle group 32 and the second nozzle group 34, (e) operating pressure (e.g., head) and flow rate (e.g., in liters per minute or gallons per minute) of the pump 26.

Under a second technique, step S104 is carried out by estimating a future ground speed of the vehicle based on the engine speed data (e.g., engine speed or change in engine speed) and the current ground speed to reduce a time lag for the rate of distribution of the material or the agricultural input. In other words, the next ground speed of the vehicle at a next vehicular position is estimated (or predetermined prior to arrival of the vehicle at the next vehicular position) based not only on the current ground speed, but based on the current ground speed (or adjusted engine speed) and the engine speed at the current vehicle position. By including the engine speed (or adjusted engine speed) as a factor in the estimate of the next ground speed, any changes to the vehicle speed are immediately anticipated as soon as a user or controller changes a setting of the throttle or a fuel metering device (e.g., responsive to pressing or releases the gas pedal), rather than when the vehicle is actually propelled at the new ground speed. The data processor 18 or dispensation system manager 20 can decrease the rate of application or distribution of material for decreases in ground speed of the vehicle as soon as the engine speed sensor 12 detects a change in the engine speed and the change is processed or interpreted by the data processor 18, as opposed to the location-determining receiver 10 or motion sensor 36 later detecting a change in the vehicle velocity or ground speed. Similarly, the data processor 18 or dispensation system manager 20 can increase the rate of application or distribution of material for increases in the ground speed of the vehicle as soon as the engine speed sensor 12 detects a change in the engine speed and the change is processed or interpreted by the data processor 18, as opposed to the location-determining receiver or motion sensor 36 detecting a change in the vehicle velocity or ground speed.

Under a third technique, the data processor 18 or dispensation system manager 20 controls the material application system 11 as a spraying system at a spray rate based on the measured ground speed and the senses engine speed to anticipate a change in the ground speed of the vehicle such that time lag in the delivered rate of agricultural input fluid or liquid is reduced.

Figure 4:
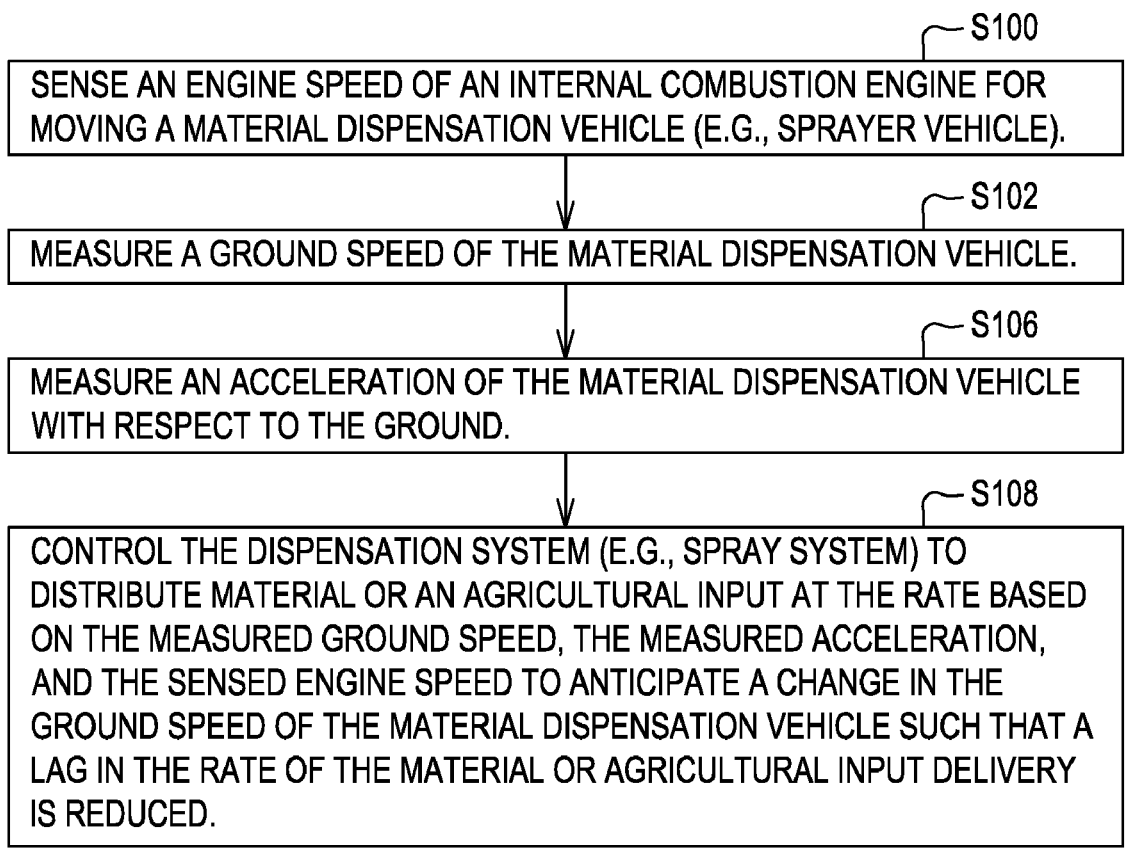
FIG. 4 is a flow chart of another example of a method for controlling a material application system.

FIG. 4 discloses another method for managing or controlling a material dispensation system. The method of FIG. 4 is similar to that of FIG. 3, except the method of FIG. 4 replaces step S104 with steps S106 and S108. Like reference numbers in FIG. 3 and FIG. 4 indicate like steps or procedures.

In step S100, an engine speed sensor 12 senses or detects engine speed data (e.g., engine speed or change in engine speed) of an internal combustion engine for moving a material dispensation vehicle. The engine speed may be associated with the rotational speed of a crankshaft of an internal combustion engine, for example.

In step S102, a ground speed sensor or a motion sensor 36 determines a ground speed or velocity (e.g., instantaneous velocity) of the material dispensation vehicle.

In step S106, a motion sensor 36 or accelerometer measures acceleration (e.g., instantaneous acceleration) of the material dispensation vehicle.

In step S108, a data processor 18 or dispensation system manager 20 controls a dispensation system to distribute material or an agricultural input at a distribution rate based on the measured ground speed, the measured acceleration and the sensed engine speed data (e.g., sensed engine speed or adjusted engine speed or change in engine speed) to anticipate a change in the ground speed of the material dispensation vehicle such that a lag in the rate of agricultural input or material is reduced.

Step S108 may be carried out in accordance with various techniques that may be applied alternately or cumulatively. Under a first technique, step S108 is carried out by retrieving the following input data from the data storage device 14: (a) dispensation time lag of an agricultural input versus engine speed data of the material dispensation vehicle and ground speed data of the material dispensation vehicle, or (b) a dispensation time lag of the agricultural input versus engine speed data, ground speed data and vehicular acceleration data of the material dispensation vehicle. The dispensation time lag may be compensated for by advancing or adjusting the dispensing of material by the dispensation time lag. The dispensation time lag may depend upon settings of the material application system (e.g., sprayer system 11 or 111) including one or more of the following factors or a time duration allowance associated with each factor: (a) viscosity or specific gravity of the agricultural input to be distributed, (b) pressure level or pressure range of the pressure regulator 28, (c) nozzle opening size or nozzle type of the nozzle groups (32, 34), (d) length of lines 31 from the pump 26 to the first nozzle group 32 and the second nozzle group 34, (e) operating pressure (e.g., head) and flow rate (e.g., in liters per minute or gallons per minute) of the pump 26.

Under a second technique, step S108 is carried out by estimating a future ground speed of the vehicle based on the current engine speed (e.g., a change in the engine speed), the current ground speed and current acceleration to reduce a time lag for the rate of distribution of the material or the agricultural input by the material application system (11 or 111). In other words, the next ground speed of the vehicle at a next vehicular position is estimated (or predetermined prior to arrival of the vehicle at the next vehicular position) based not only on the current ground speed, but based on the combination of the current ground speed, current acceleration and the current engine speed (e.g., change in engine speed) at the current vehicle position. By including the current engine speed (e.g., change in engine speed) and current acceleration as a factor in the estimate of the next ground speed, any changes to the vehicle speed are immediately anticipated as soon as a user or controller changes a setting of the throttle or fuel metering device (e.g., responsive to an operator pressing or releasing the gas pedal) and it is interpreted or processed by a data processor 18, rather than when the vehicle is actually propelled at or actually reaches the new ground speed. After the user changes the engine speed based on the setting of the throttle or fuel metering device, the vehicle subsequently reaches a new ground speed based on the change in the setting of the throttle or fuel metering device, for example.

Under the second technique for carrying out step S108, the data processor 18 or dispensation system manager 20 can decrease the rate of application or distribution of material for decreases in ground speed of the vehicle (e.g., material dispensation vehicle) as soon as the engine speed sensor 12 detects a change in the engine speed and the change is processed or interpreted by a data processor 18, as opposed to the location-determining receiver 10 or motion sensor 36 detecting a change in the vehicle velocity or ground speed. Similarly, the data processor 18 or dispensation system manager 20 can increase the rate of application or distribution of material for increases in the ground speed of the vehicle as soon as the engine speed sensor 12 detects a change in the engine speed and the change is processed or interpreted by the data processor 18, as opposed to the location-determining receiver 10 or motion sensor 36 detecting a change in the vehicle velocity or ground speed.

Figure 5:
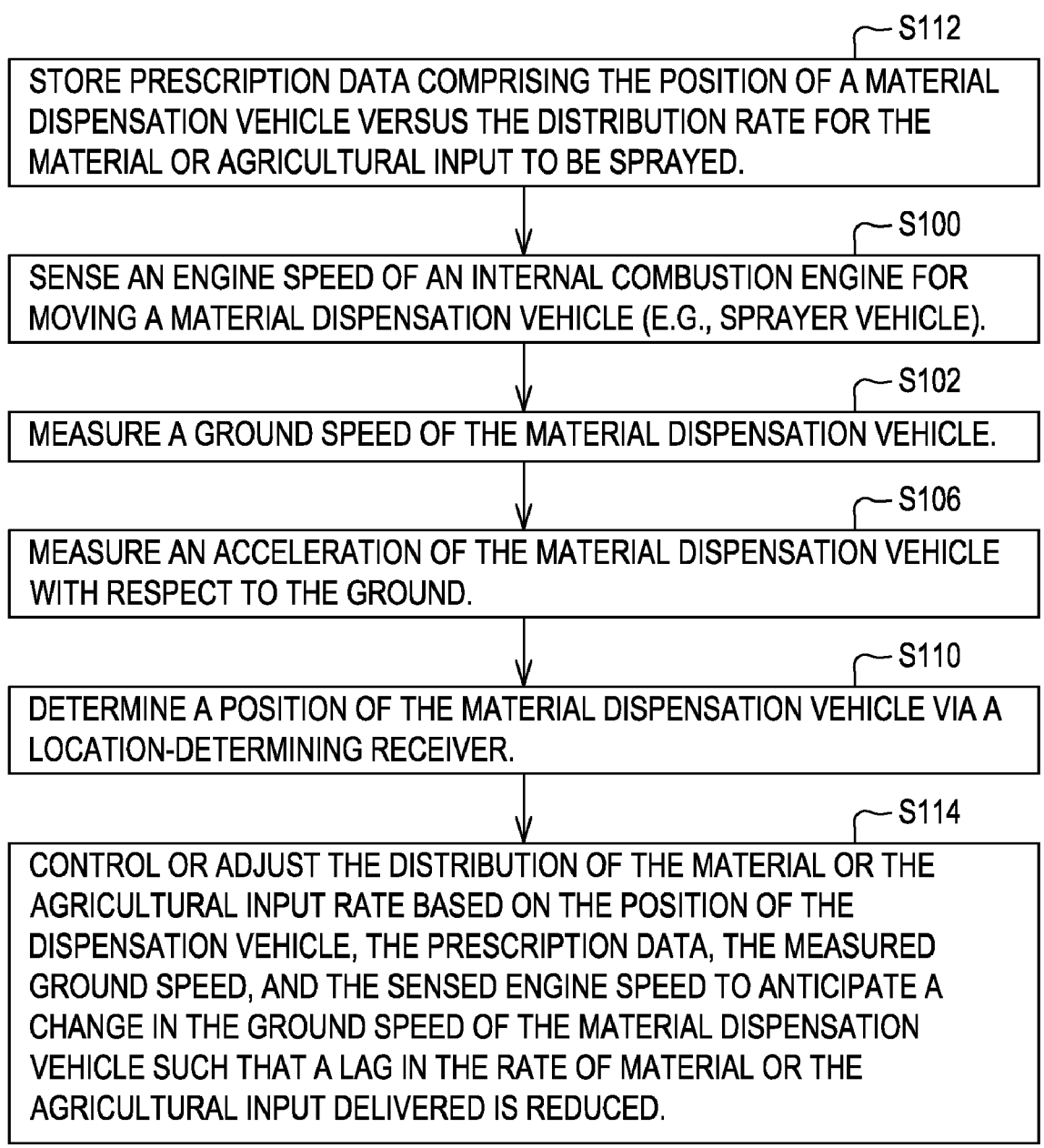
FIG. 5 is a flow chart of yet another example of a method for controlling a material application system.

FIG. 5 discloses another embodiment of a method for controlling a material dispensation system.

In step S100, an engine speed sensor 12 senses or detects engine speed data (e.g., an engine speed or a change in engine speed) of an internal combustion engine for moving a material dispensation vehicle. The engine speed may be associated with the rotational speed of a shaft (e.g., crankshaft) of an internal combustion engine.

In step S102, a motion sensor 36 (e.g., ground speed sensor) or location-determining receiver 10 determines or estimates a ground speed of the material dispensation vehicle.

In step S106, a motion sensor 36 or accelerometer measures an acceleration of the material dispensation vehicle.

In step S110, a location-determining receiver 10 determines a position of the material dispensing vehicle.

In step S114, a data processor 18 controls or adjusts the distribution rate of the material or the agricultural input based on the position of the material dispensing vehicle, the prescription data, the measured ground speed, and the sensed engine speed data (e.g., sensed engine speed or the change in the engine speed) to anticipate a change in the ground speed of the material dispensation vehicle such that a lag in the rate of material or the agricultural input delivered is reduced.

Step S114 may be carried out in accordance with various techniques that may be applied alternately or cumulatively. Under a first technique, step S114 is carried out by retrieving the following data from the data storage device 14: dispensation time lag of the agricultural input versus engine speed data, ground speed data, vehicular acceleration data, vehicular position and prescription data. The dispensation time lag may be compensated for by advancing the dispensing of material by the dispensation time lag. The dispensation time lag may depend upon settings of the dispensation system (e.g., sprayer system) including one or more of the following factors or a time duration allowance associated with each factor: (a) viscosity or specific gravity of the agricultural input to be distributed, (b) pressure level or pressure range of the pressure regulator 28, (c) nozzle opening size or nozzle type, (d) length of lines 31 from the pump 26 to the first nozzle group 32 and the second nozzle group 34, (e) operating pressure and flow rate (e.g., in liters per minute or gallons per minute) of the pump 26.

Under a second technique, step S114 is carried out by estimating a future ground speed of the vehicle based on the current engine speed (e.g., a change in engine speed), the current ground speed a current acceleration, vehicular position, and prescription data to reduce a time lag for the rate of distribution of the material or the agricultural input. In other words, the next ground speed of the vehicle at a next vehicular position is estimated based not only on the current ground speed, but based on the current ground speed, current acceleration, vehicular position, prescription data and the engine speed (e.g., change in engine speed) at the current vehicle position. By including the current engine speed (e.g., change in engine speed) and current acceleration as factors in the estimate of the next ground speed, any changes to the vehicle speed are immediately anticipated as soon as a user or controller changes a setting of the throttle or fuel metering device (e.g., by pressing or releasing the gas pedal) and processed by the data processor 18, rather than when the vehicle is actually propelled at or reaches the new ground speed. The data processor 18 or dispensation system manager 20 can decrease the rate of application or distribution of material for decreases (or anticipated decreases) in ground speed of the vehicle as soon as the engine speed sensor 12 detects a change in the engine speed and the change is processed by the data processor 18, as opposed to the location-determining receiver 10 or motion sensor 36 detecting a resultant change in the vehicle velocity or ground speed. Similarly, the data processor 18 or dispensation system manager 20 can increase the rate of application or distribution of material for increases in the ground speed of the vehicle as soon as the engine speed sensor 12 detects a change in the engine speed, as opposed to the location-determining receiver 10 or motion sensor 36 detecting a change in the vehicle velocity or ground speed.

Having described the preferred embodiment, it will become apparent that various modifications can be made without departing from the scope of the invention as defined in the accompanying claims.

I claim:

1. A method for managing a dispensation of an agricultural input, the method comprising:
   sensing engine speed data of an internal combustion engine for moving a material distribution vehicle;
   measuring a ground speed of the material distribution vehicle; and
   controlling, a dispensation system to distribute an agricultural input or material at a distribution rate based on the measured ground speed and the sensed engine speed data to anticipate a change in the ground speed of the material distribution vehicle from interpretation, by a data processor, of an operator input prior to reaching a new ground speed such that a lag in the distribution rate of the agricultural input delivered is reduced.

2. The method according to claim 1 wherein the sensing of the engine speed data comprises sensing a change in an engine speed of the internal combustion engine.

3. The method according to claim 1 wherein the sensing of the engine speed data comprises sensing an adjusted engine speed adjusted for a gear selection of a transmission or transaxle of the material distribution vehicle.

4. The method according to claim 1 wherein the sensing of the engine speed data comprises sensing a throttle position or throttle opening and deriving the engine speed from the throttle position or the throttle opening.

5. The method according to claim 1 wherein the sensing of the engine speed data comprises a sensing a rotational rate of a shaft of the internal combustion engine via a stationary magnetic field sensor and a magnet mounted the shaft.

6. The method according to claim 1 further comprising:
   measuring an acceleration of the material distribution vehicle with respect to the ground;
   controlling the dispensation system to distribute at the distribution rate based on the measured ground speed, the measured acceleration, and the sensed engine speed data to anticipate a change in the ground speed of the material distribution vehicle such that a lag in the rate of fluid delivery is reduced.

7. The method according to claim 1 further comprising:
   determining a position of the material distribution vehicle via location-determining receiver;
   storing prescription data comprising the position of the vehicle versus the distribution rate for the agricultural input to be dispensed via the dispensation system, and
   adjusting the distribution rate based on the position of the material distribution vehicle, the prescription data, the measured ground speed and the sensed engine speed data to anticipate a change in the ground speed of the material distribution vehicle such that a lag in the distribution rate of agricultural input delivered is reduced.

8. The method according to claim 1 further comprising:
   determining a position of the material distribution vehicle via a location-determining receiver;
   storing prescription data comprising the position of the vehicle versus the distribution rate for the fluid to be sprayer; and
   adjusting the distribution rate based on the position of the material distribution vehicle, the prescription data, the measured ground speed, measured acceleration, and the sensed engine speed data to anticipate a change in the ground speed of the material distribution vehicle such that a lag in the rate of the agricultural input delivered is reduced.

9. The method according to claim 1 wherein the lag comprises a dispensation time lag that is associated with settings or factors of the dispensation system.

10. The method according to claim 9 wherein the factors comprise one or more of the following: (a) a viscosity or a specific gravity of the agricultural input to be distributed via the dispensation system, (b) a pressure level or pressure range of a pressure regulator associated with a pump of the dispensation system, (c) a nozzle opening size or a nozzle type of the dispensation system, (d) a length of lines from the pump to a first nozzle group and a second nozzle group, or (e) an operating pressure and a flow rate of the pump.

11. A system for managing a dispensation of an agricultural input, the system comprising:
    an engine speed sensor or sensing engine speed data of an internal combustion engine for moving a material distribution vehicle;
    a location-determining receiver for measuring a ground speed of the material distribution vehicle; and
    a data processor for controlling a dispensation system to distribute an agricultural input or material at a distribution rate based on the measured ground speed and the sensed engine speed data to anticipate a change in the ground speed of the material distribution vehicle from interpretation, by the data processor, of an operator input prior to reaching a new ground speed such that a lag in the distribution rate of the agricultural input delivered is reduced.

12. The system according to claim 11 wherein the engine speed sensor is capable of sensing a change in an engine speed of the internal combustion engine.

13. The system according to claim 11 wherein the engine speed sensor comprises a throttle position sensor for sensing a throttle position or throttle opening and deriving the engine speed from the throttle position or the throttle opening.

14. The system according to claim 11 wherein the engine speed sensor comprises a stationary magnetic field sensor and a magnet mounted on a shaft of the internal combustion engine.

15. The system according to claim 11 further comprising:
    a motion sensor for measuring an acceleration of the material distribution vehicle with respect to the ground; and
    a dispensation system manager for controlling the dispensation system to distribute at the distribution rate based on the measured ground speed, the measured acceleration, and the sensed engine speed data to anticipate a change in the ground speed of the material distribution vehicle such that a lag in the rate of fluid delivery is reduced.

16. The system according to claim 11 further comprising:
    the location-determining receiver arranged for determining a position of the material distribution vehicle;
    a data storage device coupled to the data processor, the date storage device storing prescription data comprising the position of the vehicle versus the distribution rate for the agricultural input to be dispensed via the dispensation system; and
    a dispensation system manager for adjusting the distribution rate based on the position of the material distribution vehicle, the prescription data, the measured ground speed and the sensed engine speed data to anticipate a change in the ground speed of the material distribution vehicle such that a lag in the distribution rate of agricultural input delivered is reduced.

17. The system according to claim 11 further comprising:
the location determining receiver arranged determining a position of the material distribution vehicle via a location-determining receiver;
a data storage device coupled to the data processor, the data storage device capable of storing prescription data comprising the position of the vehicle versus the distribution rate for the fluid to be sprayer; and
the data processor arranged for adjusting the distribution rate based on the position of the material distribution vehicle, the prescription data, the measured ground speed, measured acceleration, and the sensed engine speed data to anticipate a change in the ground speed of the material distribution vehicle such that a lag in the rate of the agricultural input delivered is reduced.

18. The system according to claim 11 further comprising:
a first nozzle group for distributing the agricultural input;
a second nozzle group for distributing the agricultural input;
a nozzle controller coupled to the first nozzle group and the second nozzle group to control the first nozzle group and the second nozzle group to adjust the distribution rate of the agricultural input consistent with the engine speed data.

19. The system according to claim 1 wherein the lag comprises a dispensation time lag that is associated with settings or factors of the dispensation system.

20. The system according to claim 19 wherein the factors comprise one or more of the following: (a) a viscosity or a specific gravity of the agricultural input to be distributed via the dispensation system, (b) a pressure level or pressure range of a pressure regulator associated with a pump of the dispensation system, (c) a nozzle opening size or a nozzle type of the dispensation system, (d) length of lines from the pump to a first nozzle group and a second nozzle group, or (e) an operating pressure and a flow rate of the pump.

* * * * *